(12) United States Patent
Giraud et al.

(10) Patent No.: US 8,180,010 B2
(45) Date of Patent: May 15, 2012

(54) METHOD FOR RECEIVING FRAMES OF A DIGITAL STREAM

(75) Inventors: Xavier Giraud, Versailles (FR); Alban Duverdier, Paris (FR)

(73) Assignee: Centre National d'Etudes Spatiales, Paris (FR)

( * ) Notice: Subject to any disclaimer, the term of this patent is extended or adjusted under 35 U.S.C. 154(b) by 495 days.

(21) Appl. No.: 12/083,490

(22) PCT Filed: Oct. 13, 2006

(86) PCT No.: PCT/FR2006/002313
§ 371 (c)(1),
(2), (4) Date: Sep. 16, 2008

(87) PCT Pub. No.: WO2007/042685
PCT Pub. Date: Apr. 19, 2007

(65) Prior Publication Data
US 2009/0161788 A1    Jun. 25, 2009

(30) Foreign Application Priority Data
Oct. 14, 2005 (FR) ...................................... 05 10523

(51) Int. Cl.
*H04L 7/00* (2006.01)
(52) U.S. Cl. ........ 375/368; 370/503; 370/509; 370/514; 375/340; 375/343
(58) Field of Classification Search .................. None
See application file for complete search history.

(56) References Cited

U.S. PATENT DOCUMENTS

| | | | |
|---|---|---|---|
| 3,663,793 A | 5/1972 | Petro et al. | |
| 4,959,256 A | 9/1990 | Piera | |
| 5,037,675 A | 8/1991 | Kishi et al. | |
| 5,309,154 A | * 5/1994 | Mun et al. | .................... 340/7.35 |
| 6,238,847 B1 | 5/2001 | Axtell, III et al. | |

(Continued)

FOREIGN PATENT DOCUMENTS
EP    0323349    7/1989
(Continued)

OTHER PUBLICATIONS

Sun et al., "Frame Synchronization and Pilot Structure for Second Generation DVB Via Satellites," Int'l J. Satellite Comm., 22(3):319-339 (2004).*

(Continued)

*Primary Examiner* — Jason Mattis
*Assistant Examiner* — James P Duffy
(74) *Attorney, Agent, or Firm* — Patterson Thuente Christensen Pedersen, P.A.

(57) ABSTRACT

A receiving method for a digital stream, the stream including frames having each a body composed of a variable number c of symbols and preceded by a header including d symbols, a field composed of a fixed number e of symbols unknown to the receiver and defining the number c. A locking phase of the receiving method includes receiving a series of e symbols of the stream;

performing a correlation computation for pairs of symbols received, the correlation computation being used to verify a predefined relationship if the e symbols form the unknown field; determining a correlation level and determining whether the e symbols form the unknown field on the basis of the correlation level;

repeating the steps until it is determined that the e symbols form the unknown field.

20 Claims, 3 Drawing Sheets

U.S. PATENT DOCUMENTS

| | | | |
|---|---|---|---|
| 2003/0059600 A1 | 3/2003 | Gazo et al. | |
| 2003/0138661 A1 | 7/2003 | Souchard et al. | |
| 2006/0176984 A1* | 8/2006 | Lee et al. | 375/343 |
| 2009/0004434 A1 | 1/2009 | Parent et al. | |
| 2011/0174826 A1 | 7/2011 | Le Bris et al. | |
| 2011/0180546 A1 | 7/2011 | Le Bris et al. | |
| 2011/0192850 A1 | 8/2011 | Le Bris et al. | |
| 2011/0198358 A1 | 8/2011 | Parent et al. | |

FOREIGN PATENT DOCUMENTS

| | | |
|---|---|---|
| EP | 0515705 | 12/1992 |
| EP | 1835002 | 9/2007 |
| FR | 2575422 | 7/1986 |
| FR | 2576038 | 7/1986 |
| FR | 2622600 | 5/1989 |
| FR | 2625494 | 7/1989 |
| FR | 2882240 | 8/2006 |
| GB | 2169282 | 7/1986 |
| JP | 2-279574 | 11/1990 |
| WO | WO99/16625 | 4/1999 |
| WO | WO00/56537 | 9/2000 |

OTHER PUBLICATIONS

Sun et al., "Frame Synchronization and Pilot Structure for Second Generation. DVB Via Satellites," Int'l J. Satellite Comm., 22(3):319-339 (2004).

Digital Video Broadcasting (DVB), "Second Generation Framing Structure, Channel Coding and Modulation Systems for Broadcasting, Interactive Services, News Gathering and Other Broadband Satellite Applications," ETSI Standards, European Telecommunications Standards Institute, Sophia-Antipo, France, V111:1-74 (Jun. 2004).

Digital Video Broadcasting (DVB), "User Guidelines for The Second.Generation System for Broadcasting, Interactive Services, News Gathering and Other Broadband Satellite Applications (DVB-S2); ETSI TR 102 376," ETSI Standards, European Telecommunications Standards Institute, Sophia-Antipo, France, BC(V111) (Feb. 2005).

Duverdier et al., "DVB Par Satellite: De La Diffusion A L'Interactivite DVB by Satellite: From Broadcasting to Interactivity,"Revue Generale De L'Electricite Et De L'Electronique, Revue Generale De L'Electricite S.A., France, 4:42-47 (Apr. 2005).

Guoqing, "A New Frequency Estimator of Single Sinusoid Based on Fitz's Algorithm," Signal Processing, Proceedings ICSP '04; 2004 $7^{th}$ Int'l Conf. Beijing, China (Aug. 31-Sep. 4, 2004); pp. 1790-1793 (Aug. 2004).

Bian et al., "An Improved Fitz Carrier Frequency Offset Estimation Algorithm,".Communication Technology Proceedings, ICCT 2003, Piscataway, NJ; IEEE 2:778-781 (Apr. 2003).

Randau et al., "Enamels and Enamelling", 1900. Scott Greenwood and Company. pp. 142-144.

Application and File History of U.S. Appl. No. 12/163,289, filed Jun. 27, 2008, inventors Parent et al.

Application and File History of U.S. Appl. No. 12/997,569, filed Apr. 11, 2011, inventors Le Bris et al.

Application and File History of U.S. Appl. No. 13/000,888, filed Apr. 4, 2011, inventors Le Bris et al.

Application and File History of U.S. Appl. No. 13/000,906, filed Apr. 25, 2011, inventors Le Bris et al.

Application and File History of U.S. Appl. No. 12/997,574, filed Apr. 4, 2011, inventors Parent et al.

* cited by examiner

Fig. 3

METHOD FOR RECEIVING FRAMES OF A DIGITAL STREAM

RELATED APPLICATIONS

This application claims priority to PCT Application No. PCT/FR2006/002313 filed Oct. 13, 2006, and French Application No. 0510523 filed Oct. 14, 2005, the disclosures of which are hereby incorporated by reference in their entireties.

FIELD OF THE INVENTION

This invention relates to digital radiofrequency broadcasting, and in particular digital broadcasting by satellite.

BACKGROUND OF THE INVENTION

The satellite broadcasting standard referred to as DVB-S2 was developed for the broadcasting of video streams as well as the broadcasting of IP application packets. This standard enables constant, variable or adaptive coding and modulation modes. The structure proposed by this standard involves a concatenation of a BCH (Bose-Chaudluri-Hocquenghem) code and an LDPC (Low Density Parity Check) code. This concatenation is preceded by an energy dispersion step and followed by a QPSK, 8-PSK, 16-APSK or 32-APSK modulation step and a step of inserting a header in $\pi/2$ BPSK.

The header contains transmission parameters. The header includes a 5-bit field called MODCOD defining the type of modulation and the coding rate of the frame. This field is previously unknown to the receiver and is protected by a Reed-Müller code (32,5) having the following generating matrix:

$$\begin{pmatrix} 0 & 1 & 0 & 1 & 0 & 1 & 0 & 1 & 0 & 1 & 0 & 1 & 0 & 1 & 0 & 1 & 0 & 1 & 0 & 1 & 0 & 1 & 0 & 1 & 0 & 1 & 0 & 1 & 0 & 1 & 0 & 1 \\ 0 & 0 & 1 & 1 & 0 & 0 & 1 & 1 & 0 & 0 & 1 & 1 & 0 & 0 & 1 & 1 & 0 & 0 & 1 & 1 & 0 & 0 & 1 & 1 & 0 & 0 & 1 & 1 & 0 & 0 & 1 & 1 \\ 0 & 0 & 0 & 0 & 1 & 1 & 1 & 1 & 0 & 0 & 0 & 0 & 1 & 1 & 1 & 1 & 0 & 0 & 0 & 0 & 1 & 1 & 1 & 1 & 0 & 0 & 0 & 0 & 1 & 1 & 1 & 1 \\ 0 & 0 & 0 & 0 & 0 & 0 & 0 & 0 & 1 & 1 & 1 & 1 & 1 & 1 & 1 & 1 & 0 & 0 & 0 & 0 & 0 & 0 & 0 & 0 & 1 & 1 & 1 & 1 & 1 & 1 & 1 & 1 \\ 0 & 0 & 0 & 0 & 0 & 0 & 0 & 0 & 0 & 0 & 0 & 0 & 0 & 0 & 0 & 0 & 1 & 1 & 1 & 1 & 1 & 1 & 1 & 1 & 1 & 1 & 1 & 1 & 1 & 1 & 1 & 1 \end{pmatrix}$$

The header also includes a 2-bit field called TYPE defining the length and the type of frame. This field is previously unknown to the receiver. The header also includes an identification sequence at the beginning of the frame called SOF, previously known to the receiver.

To lock the frame, at each symbol time, the receivers envisaged in the literature compute a correlation level by correlation computations between 26 consecutive sampled symbols. When the correlation level exceeds a threshold, it is considered that these 26 symbols correspond to the SOF identification sequence. A frequency shift error estimation is established on the basis of these symbols and used in a frequency-tracking loop.

Such a receiver has disadvantages. Indeed, the locking performed by the identification of symbols of the SOF sequence can be unreliable when the digital stream is transmitted in a noisy environment. Similarly, the frequency shift error estimation established has a reduced reliability in such an environment. The speed and reliability of the locking are thus insufficient, which is particularly detrimental since, in the absence of decoding of a header, the position of the next headers cannot be determined, as the frames have variable sizes.

Therefore, there is a need for simple means involving a reduced processing power in order to overcome one or more of these disadvantages.

SUMMARY OF THE INVENTION

The invention thus relates to a method for receiving a digital stream by a receiver, the stream comprising frames having each a body composed of a variable number c of symbols preceded by a header including a number d of symbols, the header comprises at least one field composed of a fixed number e of symbols unknown to the receiver and defining the number c, said method having a locking phase comprising:

a) receiving at least one series of e symbols of the digital stream;

b) for a plurality of first pairs of received symbols, performing a correlation computation between the symbols of each pair, wherein said correlation computation is used to verify a predefined relationship if the e symbols form the unknown field;

c) determining a correlation level on the basis of the performed correlation computation and determining whether the e symbols of the digital stream form the unknown field based on said correlation level;

d) repeating steps a), b) and c) until it is determined that the e symbols of the digital stream form the unknown field.

In one embodiment of the invention, during step b), a plurality of correlation computations between second pairs of symbols are also performed, said correlation being assumed to verify a predefined relationship if the e symbols form the unknown field, and all of the symbols of the second pairs having symbols in common with all of the symbols of the first pairs.

In another embodiment, the symbols of the second pairs belong primarily to all of the symbols of the first pairs.

In yet another embodiment, the product of the symbols of each of the pairs is assumed to be identical if the e symbols form the unknown field.

In yet another embodiment of the invention:
the header of each frame also has a field composed of a fixed number f of symbols known to the receiver;
in step a), a series of d symbols of the digital stream is received;
in step b), the symbols of each first pair correspond either to the known field or to the unknown field;
in step c), the correlation level is determined on the basis of correlation computations performed respectively on the symbols corresponding to the known field and on the symbols corresponding to the unknown field;
in step d), it is determined whether the d symbols of the digital stream form a header according to the correlation level.

According to yet another embodiment:
a first number g summing the correlation computations performed on the first pairs of symbols corresponding to the known field and a second number h summing the correlation computations performed on the first pairs of symbols corresponding to the unknown field are formed;

the correlation level Corr is determined by the following function: Corr=max(|g+h|, |g−h|).

According to another embodiment, the correlation computations are performed on the basis of all of the symbols corresponding to the known field and to the unknown field.

In yet another embodiment, an estimation of a frequency shift error is performed on the basis of said symbols received, and the demodulation frequency of a symbol receiving circuit is corrected on the basis of said estimation.

In another embodiment of the invention, a flexible decoding of the symbols of the unknown field determined is performed, a likelihood level of the decoded field is determined, and an unlocking is determined when the likelihood level of the unknown field is below a threshold.

In yet another embodiment, the flexible decoding is a Reed-Müller decoding combining the symbols of the unknown field determined so as to establish a validity probability for each combination of bits of the coded word and in which the likelihood level is established on the basis of the highest probability.

According to an embodiment, the method further includes the following steps:
  e) after the locking, for each frame, the e symbols forming the unknown field of its header are decoded so as to deduce the number c and deduce whether the receiver is addressed by the frame; and
  f) if the receiver is not addressed by the frame, the receiver does not decode the body and decodes the header of the next frame.

According to another embodiment: in the decoding of the header in step e), it is deduced whether the phase indicators are present in the body of the frame; and
  if the presence of phase indicators is deduced in the body of the frame, the phase of the symbols corresponding to the body is corrected on the basis of these phase indicators.

The frames received may comply with standard DVB-S2.

The invention also relates to a method for transmitting a digital stream, the method comprising:
  generating frames of a digital stream, in which each frame includes:
    a coding of a word defining at least the variable number c of bits of the body of the frame, wherein the field thus coded has a fixed number e of bits and redundancies of the bits of the word according to a predefined arrangement;
    the formation of a frame including:
      a header including the coded field and a identification word at the beginning of the frame with redundancies and including a fixed number f of bits;
      the body of the frame;
  transmitting the formed frame; and
  receiving, according to a method defined above, the transmitted frame.

The invention also relates to a receiver, capable to carry out a receiving method as defined above.

The invention also relates to a system comprising such receiver and a transmitter capable to carry out the transmitting method defined above.

BRIEF DESCRIPTION OF THE DRAWINGS

Other features and advantages of the invention will become clear from the following description, provided solely for indicative and non-limiting purposes, in reference to the appended drawings, in which.

DETAILED DESCRIPTION OF THE DRAWINGS

The invention proposes a method for receiving a digital stream in which each frame has a field of a fixed size unknown to the receiver defining the variable size of the body of the frame. The invention proposes locking by performing correlation computations on the symbols assumed to correspond to the unknown field. As the symbols of an unknown field form pairs for which the correlation properties verify a predefined relationship, a correlation level is determined on the basis of the correlation computations performed and make it possible to determine whether the symbols received are the symbols of the unknown field.

As the correlation level used to perform the locking of a frame of the digital stream thus takes into account the symbols of the unknown field, the locking can be performed quickly and with increased reliability. This advantage is enhanced by the size of the unknown field, generally greater than the size of the known field.

Figure 1:
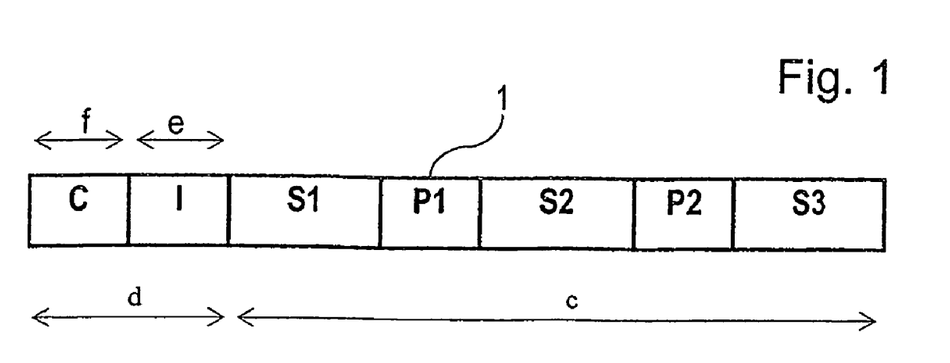
FIG. 1 schematically shows an example of a frame structure of the binary stream.

FIG. 1 shows an example of frame 1 transmitted in the digital stream. Frame 1 has a header including a field C known to the receiver and a field I unknown to the receiver. Field C has a length of f bits, and field I has a fixed length of e bits and the header has a length of d bits. Frame 1 has a body with a variable length of c bits. This body includes sections S1, S2 and S3 separated by phase indicators P1 and P2.

The invention proposes locking the frame by receiving a series of e symbols of the digital stream. The receiver previously knows the arrangement of the symbols of the unknown field of a frame, the product of the symbols of the unknown field verifying a predefined relationship. In particular, the product of symbols of the unknown field at given positions can be constant. The receiver performs correlation computations between first pairs of symbols received, and the product of the symbols of each pair being assumed to verify a predefined relationship according to the known arrangement. A correlation level is determined based on the performed correlation computations. On the basis of this correlation level, it is determined whether the received symbols form the unknown field I, by comparing, for example, the correlation level with a locking threshold. Indeed, only the symbols of the unknown field I will have a sufficient correlation level in practice, since they are statistically the only ones to verify the property of pairs formed according to a certain arrangement, and having a product verifying the predefined relationship.

If it is determined that the symbols of the digital stream do not correspond to the unknown field I, a new level of correlation is calculated for new symbols received, until the unknown field I is identified in order to determine a locking. Insofar as the locking is not performed, a correlation level can be calculated at each symbol time on the basis of the symbols contained in a delay line storing the received symbols.

Defined positions of symbols forming pairs in which the product verifies a predefined relationship can be generated by using a symmetrical coding of the unknown field I at the transmission, for example by using a Reed-Müller code. A Reed-Müller code results in pairs having a constant product.

The symbols used for the computations form other pairs for which a product has a predefined relationship. Correlation computations are performed on these other pairs and are also taken into account in order to determine the correlation level.

The reliability of the locking is thus reinforced.

The known field C is also used to perform the locking, and thus increase its reliability and speed. The number d of symbols, for example, is received. Pairs of symbols assumed to belong to the known field C, and for which a product verifying a predefined relationship is pending, and, as described above, pairs of symbols assumed to belonging to the unknown field, are formed. Correlation computations between the symbols of each pair are performed in order to determine the correlation level. The known field C is, for example, an identification field consisting of a series of identical symbols.

The following is an example of a computation of the correlation level:

Let g be the sum of the correlation computations performed on the symbols assumed to belong to the known field C and let h be the sum of the correlation computations performed on the symbols assumed to belong to the unknown field I. A correlation level can then be obtained by the following formula: Corr=max(|g+h|, |g−h|).

Such a correlation level is thus insensitive to the coding differences capable of occurring between the known field C and the unknown field I. To increase the reliability of the locking, all of the symbols of fields C and I are taken into account in order to perform the correlation computations.

The symbols received are used to generate a frequency shift error estimation. This estimation is then used to correct the demodulation frequency of a symbol receiving circuit.

A locking confirmation test is performed on the first locked header. A flexible decoding of the symbols of the unknown field I is performed, then a likelihood level of this field is deduced. When the likelihood level of the unknown field I is below a probability threshold, an unlocking is identified and the locking phase is reactivated.

Similarly, a synchronization test can be performed on the headers received after the locking. After determining a likelihood level, this level is compared with a likelihood threshold, preferably below the likelihood threshold used for the locking confirmation test. If the likelihood level is below this threshold, a synchronization loss is identified and the locking phase is reactivated.

When the symbols of the unknown field I correspond to a word coded by a Reed-Müller code, combinations of each symbol received from the unknown field are established, with each combination corresponding to a possible code word. A probability of validity is calculated for each combination, with the likelihood level corresponding to the combination having the highest validity probability.

After the locking, the unknown field received for each frame is decoded so as to deduce the length c of the body. The decoding also makes it possible to determine whether the receiver is addressed by the frame. If this is not the case, the receiver does not process the body of the frame and decodes the header of the next frame.

The receiver decodes the unknown field C in order to determine whether phase indicators are present in the body of the frame. If this is the case, the indicators are decoded and the phase of the symbols corresponding to the body is corrected on the basis of these indicators.

The example described below is a particular application of the invention in a communication implementing the standard DVB-S2, defined in the recommendation ETSI EN 302-307 v1.1.1.

The transmitter forms frames as follows. In a manner known per se, the transmitter forms the body of the frame by performing an energy dispersion on the data bits to be transmitted, by forming a BCH code and an LDPC code, then by concatenating the BCH code and the LDPC code. A QPSK, 8-PSK, 16-APSK or 32-APSK modulation is then applied, optionally followed by an insertion of pilots and a jamming step. A header in $\pi/2$ BPSK is then inserted.

The header is formed as follows. A MODCOD field, initially unknown to the receiver, defines the type of modulation and the coding rate of the frame. This field is initially coded on 5 bits. A TYPE field, initially unknown to the receiver, defines the type of frame. This field is initially coded on 2 bits: a first bit t0 identifying the length of the frame (0 for a frame of 64800 bits and 1 for a frame of 16200 bits) and a second bit t1 indicating the presence of pilots in the frame (t1=0 in the absence of pilots and t1=1 in the presence of pilots).

The MODCOD field is coded by multiplication with the Reed-Müller matrix (32,5) described in the Background section. The 32-bit vector thus formed includes bits $b_0$ to $b_{31}$. The vector b and the field TYPE are coded in a 64-bit vector denoted $\epsilon$ and of which the bits will be named $\epsilon_0$ $\epsilon_{63}$, defined as follows: $\epsilon_{2k}=b_k+t_0[2]$ and $\epsilon_{2k+1}=\epsilon_{2k}+t_1[2]$.

Due to the use of the Reed-Müller coding, it can be noted that the vector $\epsilon$ has the following properties: regardless of the values of the 5 bits of the MODCOD and of the two bits of TYPE, the product $\epsilon_k \cdot \epsilon_{k+2P}$ is constant for a value of p between 0 and n, with n being the number of lines of the Reed-Müller matrix minus one. Such a coding introduces deterministic redundancies.

The vector $\epsilon$ is subjected to scrambling by a fixed sequence of 64 bits in order to obtain vector s$\epsilon$. An identification sequence at the beginning of the frame SOF known to the receiver and having a length of 26 bits is inserted in front of the vector s$\epsilon$ in order to form a vector named y with a length of 90 bits. This identification sequence is intended to facilitate the locking of the frame at the reception. The vector y thus obtained is subjected to a modulation in $\pi/2$ BPSK, in order to obtain a vector of 90 symbols denoted yx. The symbols of yx are defined as follows:

$$yx_{2k}=(1-2y_{2k})*e^{j\pi/4} \text{ and } yx_{2k+1}=(1-2y_{2k+1})*e^{j3\pi/4}$$

Figure 2:
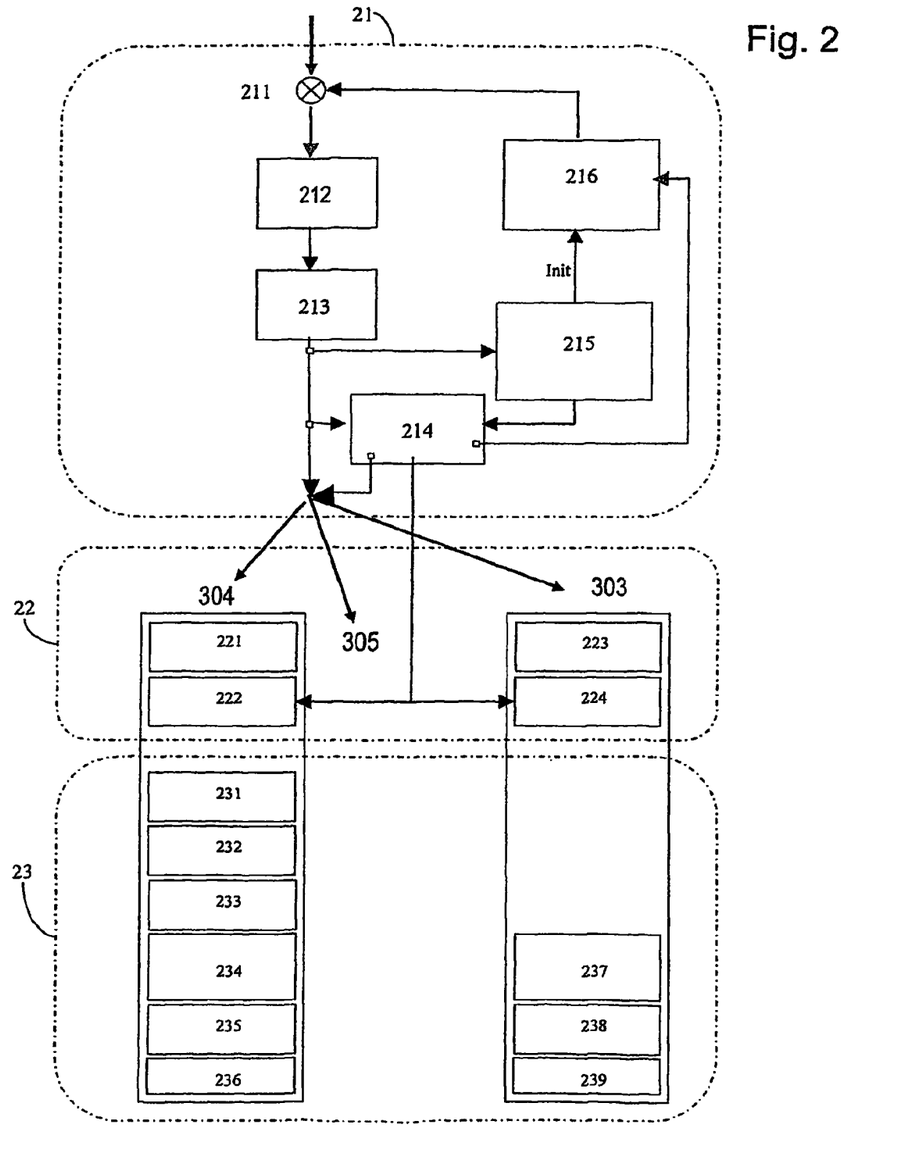
FIG. 2 schematically shows the structure of an example of a receiver carrying out the invention.

FIG. 2 schematically shows an example of a receiver structure capable to carry out the invention. The receiver 1 comprises modules 21 to 23.

Module 21 is intended to perform an adapted filtering of the received signal, a timing recovery, perform a decoding of the headers, a locking of the frames, and a frequency tracking and synchronization. Module 21 includes a digital control oscillator 211, an adapted filter 212, a timing recovery component 213, a header decoder 14, a frame synchronizer 215 and a frequency-tracking component 216. The decoding of the header in module 21 makes it possible to deduce the length of the frame, the presence of pilots in the frame, the constellation I,Q used and the coding rate used.

Module 22 is intended to constitute the frame. Module 22 can determine the position of the header on the basis of parameters decoded in header 21 by module 21. Module 22 also determines whether the frame is addressed to receiver 1.

Thus, if the frame is not addressed to receiver 1 (State 304 in the figure), module 22 cannot take into account the symbols received until the next header.

If the frame is addressed to receiver 1, module 22 performs steps 221 and 222 in the presence of pilots in the frame (State 303 in the figure) and steps 223 and 224 in the absence of pilots (State 305 in the figure). Module 22 initializes a physical descrambling in step 221 or 223, then applies this physical descrambling on each sample until the next header is reached. Module 22 then performs a phase shift of the next header in step 222 or 224. For ease of processing, the samples of the header and the pilots are preferably quantified in I,Q, and the remainder of the frame can be quantified in I, Q or in polar coordinates. Preferably, module 22 forms the frame as a vector containing phase data from the header, followed by a section of the body of the frame. The vector can contain various other phase data from any respective pilots, with each phase data item being followed by a respective section of the body of the frame.

Module 23 is intended to process the frames addressed to receiver 1 (States 303 and 305 in FIG. 2).

In the presence of pilots (State 303), module 23 performs a precise estimation 231 and correction 232 of the frequency. In step 233, the pilots are removed from the vector. In step 234, a tracking and phase correction are performed on the basis of the phase data surrounding each section. For this, it is possible to implement a progressive phase correction and a regressive phase correction on each section, by initializing each correction by the phase data placed in front of or after each section. After correction, in step 235, a quantification of the likelihoods of the bits carried by the symbols is performed. The new frame thus obtained is successively decoded in step 236 by an LDPC decoder and a BCH decoder, according to standard DVB-S2.

In the absence of pilots (State 305), steps 237 to 239 are implemented. In step 237, a tracking and phase correction are performed on the basis of the phase data surrounding the body, i.e. the phase data contained in the header of the frame and the header of the next frame. For this, it is possible to implement a progressive phase correction and a regressive phase correction on each frame body, by initializing each correction respectively by the phase data placed in front of and after the frame. Steps 238 and 239 are substantially identical to steps 235 and 236, respectively.

Figure 3:
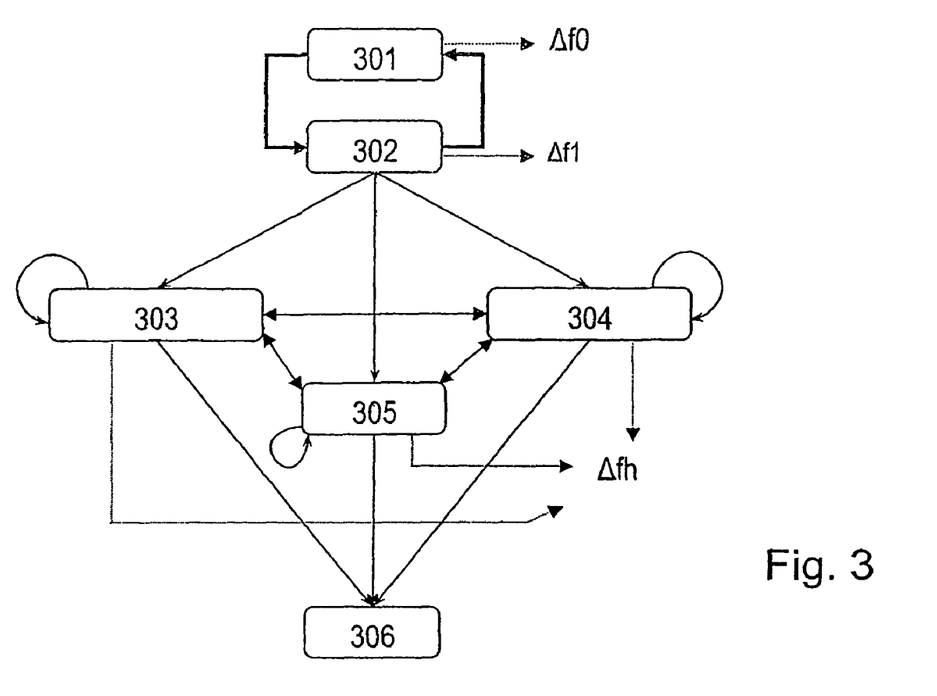
FIG. 3 shows a diagram of the state of the receiver of FIG. 2.

FIG. 3 shows an example of a state diagram of the operation of receiver 1 of FIG. 2.

In state 301, receiver 1 attempts to lock the frame. Receiver 1 thus searches for the first header using a method of which an example is provided below. After having locked the frame and identified the presence of a header, receiver 1 provides a first estimation of the frequency shift $\Delta f0$. This first estimation $\Delta f0$ is provided to frequency-tracking component 216. The header identified is then corrected with this first estimation $\Delta f0$. The header is then decoded with an algorithm insensitive to any phase shift. The position of the next header is then deduced from this decoding. In state 302, receiver 1 has locked a frame and performed a corrected estimation $\Delta f1$ on its header as well as on the next headers. This corrected estimation $\Delta f1$ can in particular be determined by the Fitz algorithm. This corrected estimation $\Delta f1$ is provided to frequency tracking component 216. Each header is decoded. On the basis of the result of the decoding, we move on to states 303, 304 or 305. If an anomaly is detected in this state, receiver 1 returns to state 301.

In states 303 to 305, an residual frequency phase-shift estimation $\Delta fh$ is computed on the basis of 90 symbols of the header and provided to frequency tracking component 216, for example by means of the Fitz algorithm. If a synchronization anomaly is detected in each of these states, we return to frame locking state 301.

In state 303, receiver 1 has determined that the frame is addressed to it contains pilots. The decoding of the header of the frame makes it possible to deduce its phase, the position of the header of the next frame and its phase. As described above, receiver 1 uses the phases from the headers and the pilots to perform a tracking and phase correction on each section of the frame. After correction, a quantification of the likelihoods of the bits carried by the symbols is performed. Then, these bits are decoded in an LDPC decoder with the parameters corresponding to the type of frame, then the bits obtained in a BCH code are decoded. An LDPC decoder with flexible inputs and a BCH decoder with hard inputs are preferably used.

In state 304, receiver 1 has determined that the frame is not addressed to it. The decoding of the header of the frame makes it possible to deduce its phase, the position of the header of the next frame and its phase. On the basis of the decoding of the next header, receiver 1 goes to one of sates 303 to 305.

In state 305, receiver 1 has determined that the frame is addressed to it and does not contain a pilot. The decoding of the header of the frame makes it possible to deduce its phase, the position of the header of the next frame and its phase. As described above, receiver 1 uses the phases deduced in order to perform a tracking and a phase correction on the body of the frame. After correction, the LDPC decoding and the BCH decoding are performed as described for state 303.

In state 301, receiver 1 does not initially know the position of the headers in the digital stream. Knowing that a header has a fixed number of 90 symbols, receiver 1 samples, in a manner known per se, 90 complex symbols of the digital stream received with 2 samples per symbol. The sampled symbols are placed in a FIFO. Then, tests are performed on all of these symbols in order to determine whether they correspond to a header. It is thus attempted to determine whether the 26 first symbols correspond to the sequence SOF and whether the 64 next symbols correspond to the remainder of the header.

To compensate for the modulation in $\pi/2$ BPSK of the transmission, the uneven index symbols are subjected to a 90° rotation. A logic descrambling is then performed: the 26 first symbols are multiplied by the known sequence SOF and the 64 next symbols are subjected to a descrambling corresponding to the scrambling at the transmission. The symbols thus modified are stored in a buffer storage. These symbols will hereinafter be denoted $z_k = s_k + n_k$, With: $n_k$ being a transmission noise term, $$s_k = \epsilon_k e^{j(\phi + k \Delta f)},$$

$\phi$ being the phase shift at the origin,
$\Delta f$ being the frequency shift,
$\epsilon_k$ being the complex symbol at time k, corresponding to an authorized constellation (if $\epsilon_k$ belongs to the field SOF of the header, $\epsilon_k = 1$ and if $\epsilon_k$ belongs to the remainder of the header, $\epsilon_k = \pm 1$).

As the properties of the field SOF of a header and of the remainder of the header are different, the distinct correlation calculations are advantageously performed on the 26 first bits and on the 64 next bits. A correlation term related to the 26 first symbols can in particular be determined by the following formula:

$$R_{SOF}(k) = \sum_{i=0}^{26-k-1} z_{i+k} z_i^* = (26-k) e^{jk \Delta f} + w_k^{(SOF)}$$

with term $w_k$ being a noise term independent of the phase.

A correlation term related to the 64 next symbols can in particular be determined by the following formula:

$$R_{MODCOD\text{-}TYPE}(k) = \sum_{q=0}^{(32/k)-1} \left( \sum_{r=0}^{k-1} z_{2kq+r+k} z_{2kq+r}^* \right)$$

Due to the properties of the Reed-Müller code, the product $\epsilon_{2kq+r+k} \cdot \epsilon_{2kq+r}$ is independent of r when k is a power of 2, with $0 \leq r \leq k$. We thus easily arrive at the following relation:

$$R_{MODCOD-TYPE}(k) = 32 \epsilon e^{jk\Delta f} + w_k^{(MODCOD-TYPE)}$$

with $\epsilon = \pm 1$ and $w_k$ being a noise term independent of the phase.

A frequency shift $\Delta f$ estimation is performed on the basis of the correlation terms above. This estimation is performed on a large number of symbols, and has a very high precision.

The Reed-Müller coding provides a code in which the symbols of which the product is constant are determined by a simple mathematical formula, which simplifies the determination of the correlation level.

With a reduced number of computations, a low correlation level is thus obtained.

Various correlation levels can thus be computed for various values of k.

The following is an example of a computation of the correlation level:

$$R(k) = \left(\frac{1}{58-k}\right) \max\left(|R_{SOF}(k) + R_{MODCOD-TYPE}(k)|, |R_{SOF}(k) - R_{MODCOD-TYPE}(k)|\right)$$

Such a level of correlation makes it possible to overcome the uncertainty on the respective signs of $R_{SOF}(k)$ and $R_{MODCOD-TYPE}(k)$, with $\epsilon$ being capable of having the value 1 or −1. In addition, a correlation level dependent both on known symbols and unknown symbols makes it possible to increase the reliability of the locking.

With a plurality of values of k, a plurality of correlation levels can thus be computed and be compared with respective thresholds in order to determine whether the f symbols received correspond to a header. The reliability of the locking can thus be increased.

Insofar as the correlation level(s) have not exceeded their locking threshold, the locking process and the computations of the correlation levels are reproduced with each new symbol received.

A likelihood test is performed when decoding the header. This test can be performed either on the header that has completed the locking or on a subsequent header, so as to respectively validate the locking or validate the frequency synchronization.

For each unknown field to be decoded, the samples are processed as described for the locking, the modulation in $\pi/2$ BPSK of the transmission is compensated, and the uneven index symbols are subjected to a 90° rotation. A logic descrambling is then performed. If the header is not the one that generated the locking, the frequency shift error determined before is corrected on the samples. The corrected samples are denoted $z_k$. The samples $z_{2k}$ and $z_{2k+1}$ and (for samples corresponding to the MODCOD-TYPE field, i.e. for k between 26 and 89) correspond to the same phase codeword in the absence of a pilot, or phase-shifted by 180° in the presence of pilots.

A computation independent of the metrics corresponding to $z_{2k}$ and $z_{2k+1}$ is performed in order to generate 32 complex metrics pairs corresponding to the 32 possible code words. Below, $y_k$ (with $0 \leq k \leq 32$) will be considered as vector $z_2$ or vector $z_{2k+1}$.

Then, the metrics are generated by the following iterative method. In a step n, $2^{5-n}$ metrics are formed $L_0$ to $L_2^{5-n}$ and with a length of $2^n$.

In a step n+1, the metrics are grouped in pairs: $L_0$ and $L_1$, $L_2$ and $L_3$ . . . .

Each metric pair thus obtained is replaced by a list of length $2^{n+1}$, as shown below:

$$L_{2i} = \begin{pmatrix} \mu_0 \\ \vdots \\ \mu_{2^n-1} \end{pmatrix}$$
$$L_{2i+1} = \begin{pmatrix} \mu'_0 \\ \vdots \\ \mu'_{2^n-1} \end{pmatrix} \rightarrow L'_i = \begin{pmatrix} \mu_0 + \mu'_0 \\ \vdots \\ \mu_{2^n-1} + \mu'_{2^n-1} \\ \mu_0 - \mu'_0 \\ \vdots \\ \mu_{2^n-1} - \mu'_{2^n-1} \end{pmatrix}$$

Thus, the first three iterations appear as follows in the example:

| | step 1 | step 2 | step 3 |
|---|---|---|---|
| $y_0$ | $y_0 + y_1$ | $(y_0 + y_1) + (y_2 + y_3)$ | $((y_0 + y_1) + (y_2 + y_3)) + ((y_4 + y_5) + (y_6 + y_7))$ |
| $y_1$ | $y_0 - y_1$ | $(y_0 - y_1) + (y_2 - y_3)$ | $\vdots$ |
| $y_2$ | $y_2 + y_3$ | $(y_0 + y_1) - (y_2 + y_3)$ | $\vdots$ |
| $y_3$ | $y_2 - y_3$ | $(y_0 - y_1) - (y_2 - y_3)$ | $\vdots$ |
| $y_4$ | $y_4 + y_5$ | $(y_4 + y_5) + (y_6 + y_7)$ | $((y_0 + y_1) + (y_2 + y_3)) - ((y_4 + y_5) + (y_6 + y_7))$ |
| $y_5$ | $y_4 - y_5$ | $(y_4 - y_5) + (y_6 - y_7)$ | $\vdots$ |
| $y_6$ | $y_6 + y_7$ | $(y_4 + y_5) - (y_6 + y_7)$ | $\vdots$ |
| $y_7$ | $y_6 - y_7$ | $(y_4 - y_5) - (y_6 - y_7)$ | $\vdots$ |
| $\vdots$ | $\vdots$ | $\vdots$ | $\vdots$ |

At the end of the fifth iteration, we have a list of complex metrics of all of the possible code words. Note each list obtained by $m_k$ for $z_{2k}$ and $m'_k$ for $z_{2k+1}$. It can be determined that the most probable code word will correspond to the value of k, for which $Vr = |m_k|^2 + |m'_k|^2$ has the maximum value.

The likelihood level Vr is compared with a threshold. If this level is below a likelihood threshold, it is deduced that the synchronization of the frame is lost and that the locking must be performed again. The likelihood threshold used for the header serving for the locking is greater than the likelihood thresholds used for the headers of the next frames. Indeed, as the likelihood level for the first header is intended to confirm the locking, the tolerance at this level must be reduced. During the tracking, the tolerance at the likelihood levels of the headers may be greater.

The TYPE field is then decoded. The value of the low-weight bit t0 of the TYPE field is determined as follows:

if $Re(m_k \cdot m'^*_k) < 0$, then t0=1 and a value $m = m_k - m'_k$ is defined;

if $Re(m_k \cdot m'^*_k) < 0$, then t0=0 and a value $m = m_k \cdot m'_k$ is defined.

The value of the high weight bit t1 of the TYPE field is determined as follows:

if $Re(m \cdot \Gamma^*_{SOF}) < 0$, then t1=1; otherwise t1=0.

With:

$$\zeta_{SOF} = \frac{1}{26}\left(\sum_{k=0}^{25} z_k\right),$$

corresponding to the arithmetic mean of the SOF field.

This decoding thus takes into account the fact that the phase is unknown when it is produced.

The invention claimed is:

1. A method for receiving a digital stream by a receiver, the stream comprising frames, each frame having a body composed of a variable quantity c of symbols preceded by a header having a total quantity d of symbols, the header comprising at least one known field of which the receiver has a priori knowledge, and at least one unknown field of which the receiver does not have a priori knowledge, the at least one unknown field composed of a fixed quantity e of symbols and encoded such that the receiver has a priori knowledge of a first relationship between certain groups of the e symbols and of a second relationship between certain other groups of the e symbols, the method comprising:
   a) storing, by the receiver, at least one series of symbols of the digital stream including at least a portion of the d symbols of the header;
   b) performing, by the receiver, a first correlation computation on at least a portion of the at least one series of symbols, wherein the first correlation computation is based on the a priori knowledge of the first relationship between the certain groups of the e symbols;
   c) performing, by the receiver, a second correlation computation on at least a portion of the at least one series of symbols, wherein the second correlation computation is based on the a priori knowledge of the second relationship between the certain other groups of the e symbols;
   d) determining a correlation level based at least on a combination of results of the first and the second correlation computations; and
   e) comparing the correlation level against a threshold level and, based on a result of that comparison, determining frame synchronization for the at least one series of symbols.

2. The method according to claim 1, wherein the certain groups of the e symbols are first pairs of symbols of the at least on unknown field and the certain other groups of the e symbols are second pairs of the e symbols of the at least one unknown field.

3. The method according to claim 2, wherein the symbols of the second pairs belong primarily to all of the symbols of the first pairs.

4. The method according to claim 1, wherein according to the first relationship a product of the symbols of each of the certain groups of e symbols is assumed to be identical if the e symbols form the unknown field.

5. The method according to claim 1, further comprising:
performing, by the receiver, a third correlation computation on at least a portion of the at least one series of symbols, wherein the third correlation computation is based on the a priori knowledge of the at least one known field, and wherein the determining the correlation level in (d) is based further on the third correlation computation.

6. The method according to claim 5, further comprising:
performing the correlation computations on a basis of all of the symbols corresponding to the known field and to the unknown field.

7. The method according claim 1, further comprising:
performing an estimation of a frequency shift error on a basis of the portion of the at least one series of symbols, and correcting a demodulation frequency of a symbol receiving circuit on the basis of the estimation.

8. The method according to claim 7, further comprising:
performing a flexible decoding of the symbols of the determined unknown field forming a decoded field;
determining a likelihood level of the decoded field; and
determining an unlocking when the likelihood level of the unknown field is below a threshold.

9. The method according to claim 8, wherein the flexible decoding is a Reed-Müller decoding combining the symbols of the determined unknown field so as to establish a validity probability for each combination of bits of a coded word and in which the likelihood level is established on a basis of a highest probability.

10. The method according to claim 1, further comprising:
decoding, for each frame, the e symbols forming the unknown field of the header of each frame so as to deduce the number c and deduce whether the receiver is addressed by the frame; and
if the receiver is not addressed by the frame, decoding, by the receiver, a header of a next frame, and not the body.

11. The method according to claim 10, further comprising:
in the decoding of the header, deducing whether phase indicators are present in the body of the frame; and
correcting the phase of the symbols corresponding to the body on a basis of the phase indicators if the presence of phase indicators is deduced in the body of the frame.

12. The method according to claim 1, wherein the frames comply with standard DVB-S2.

13. A method for transmitting a digital stream, comprising:
generating frames of a digital stream, in which each frame comprises a header and a body, wherein:
the header has a first portion that contains a set of predefined symbols and a second portion that contains a set of non-predefined symbols, the non-predefined symbols representing at least one parameter of the body; and
wherein the set of non-predefined symbols is composed of a first subset and a second subset and wherein:
the first subset is encoded with a first deterministic encoding to produce a first encoded portion; and
the second subset and the first encoded portion are together encoded with a second deterministic encoding that defines a first set of predefined relationships and a second set of predefined relationships between the symbols of the set of non-predefined symbols; and transmitting the frame.

14. A receiver apparatus for receiving a digital stream, the receiver apparatus comprising:

a frame synchronization module configured to perform frame synchronization on the digital stream, wherein the digital stream includes frames, each frame having a body composed of a variable quantity c of symbols preceded by a header having a total quantity d of symbols, the header comprising at least one known field of which the receiver apparatus has a priori knowledge, and at least one unknown field of which the receiver apparatus does not have a priori knowledge, the at least one unknown field composed of a fixed quantity e of symbols and encoded such that the receiver apparatus has a priori knowledge of a first relationship between certain groups of the e symbols and of a second relationship between certain other groups of the e symbols, wherein the frame synchronization module is adapted to:

store at least one series of symbols of the digital stream including at least a portion of the d symbols of the header;

perform a first correlation computation on at least a portion of the at least one series of symbols, wherein the first correlation computation is based on the a priori knowledge of the first relationship between the certain groups of the e symbols;

perform a second correlation computation on at least a portion of the at least one series of symbols, wherein the second correlation computation is based on the a priori knowledge of the second relationship between the certain other groups of the e symbols;

determine a correlation level based at least on a combination of results of the first and the second correlation computations; and compare the correlation level against a threshold level and, based on a result of that comparison, determine frame synchronization for the at least one series of symbols.

15. The receiver apparatus according to claim 14, wherein the frame synchronization module comprises:

a digital control oscillator;
an adapted filter;
a timing recovery component;
a header decoder;
a frame synchronizer; and
a frequency-tracking component.

16. The receiver apparatus according to claim 14, further comprising:

a frame constituting module adapted to determine a position of the header of a first frame based on decoding performed by the frame synchronization module, and to determine whether the first frame is addressed to the receiver apparatus; and a frame processing module adapted to decode the first frame in response to a determination made by the frame constituting module that the first frame is addressed to the receiver apparatus.

17. The receiver apparatus according to claim 14, wherein the certain groups of the e symbols are first pairs of symbols of the at least on unknown field and the certain other groups of the e symbols are second pairs of the e symbols of the at least one unknown field.

18. The receiver apparatus according to claim 17, wherein the symbols of the second pairs belong primarily to all of the symbols of the first pairs.

19. The receiver apparatus according to claim 14, wherein the frame synchronization module is adapted to perform a third correlation computation on at least a portion of the at least one series of symbols, wherein the third correlation computation is based on the a priori knowledge of the at least one known field, and to determine the frame synchronization for the at least one series of symbols based further on the third correlation computation.

20. A communication system comprising:

a transmitter adapted to generate and transmit frames of a digital stream in which each frame comprises a header and a body, wherein:

the header has a first portion that contains a set of predefined symbols and a second portion that contains a set of non-predefined symbols, the non-predefined symbols representing at least one parameter of the body; and wherein the set of non-predefined symbols is composed of a first subset and a second subset and wherein:

the first subset is encoded with a first deterministic encoding to produce a first encoded portion; and the second subset and the first encoded portion are together encoded with a second deterministic encoding that defines a first set of predefined relationships and a second set of predefined relationships between the symbols of the set of non-predefined symbols.

* * * * *